United States Patent
Eimura

(10) Patent No.: US 7,320,768 B2
(45) Date of Patent: Jan. 22, 2008

(54) METAL MOLD FOR A CONNECTED PRODUCT AND METHOD OF MOLDING THE PRODUCT

(75) Inventor: Katsuji Eimura, Kusatsu (JP)

(73) Assignees: Mishima Giken Co., Ltd., Shiga (JP); Kakuichikasei Co., Ltd., Osaka (JP)

( * ) Notice: Subject to any disclaimer, the term of this patent is extended or adjusted under 35 U.S.C. 154(b) by 653 days.

(21) Appl. No.: 10/494,592

(22) PCT Filed: Jul. 6, 2003

(86) PCT No.: PCT/JP03/08581

§ 371 (c)(1),
(2), (4) Date: May 5, 2004

(87) PCT Pub. No.: WO2004/018178

PCT Pub. Date: Mar. 4, 2004

(65) Prior Publication Data

US 2005/0012240 A1    Jan. 20, 2005

(30) Foreign Application Priority Data

Jul. 4, 2002   (JP) ............................. 2002-196377

(51) Int. Cl.
B29C 45/16      (2006.01)

(52) U.S. Cl. .................. 264/242; 264/255; 425/117; 425/577; 425/814

(58) Field of Classification Search ............... None
See application file for complete search history.

(56) References Cited

U.S. PATENT DOCUMENTS

| | | | | |
|---|---|---|---|---|
| 2,509,278 A | * | 5/1950 | Scheuermann et al. | ..... 249/142 |
| 2,577,350 A | * | 12/1951 | Morin | .......... 264/161 |
| 4,414,170 A | * | 11/1983 | Sano | ........... 264/242 |
| 4,702,156 A | * | 10/1987 | Sano | ........... 454/313 |
| 4,790,973 A | * | 12/1988 | Minami et al. | ............. 264/242 |
| 5,013,511 A | | 5/1991 | Akashi | |
| 5,304,336 A | * | 4/1994 | Karlsson et al. | ............ 264/242 |
| 5,421,718 A | | 6/1995 | Karlsson et al. | |
| 5,482,506 A | * | 1/1996 | Tsuda et al. | ................. 454/155 |
| 6,752,950 B2 | * | 6/2004 | Clarke | ........... 264/255 |

FOREIGN PATENT DOCUMENTS

| | | |
|---|---|---|
| JP | 2-153724 | 5/1991 |
| JP | 4-64420 | 2/1992 |
| JP | 05-141540 | 6/1993 |
| JP | 10-44195 | 2/1998 |

* cited by examiner

Primary Examiner—Edmund H. Lee
(74) Attorney, Agent, or Firm—Milde & Hoffberg, LLP

(57)  ABSTRACT

An object of the present invention is to provide a metal mold of a simple structure that can be used for injection molding a combined product composed of some molded pieces regardless of the accuracy and the shape of a desired combined product and a method of molding such combined product. A metal mold M for injection molding comprises a first piece mold 5 for molding a first molded piece 2, a second piece mold 4 for molding a second molded piece 6, and a pin core 8 for forming an insertion hole 1. A method of injection molding a combined product P comprises the steps of injection molding the first molded piece 2 from a first plastic resin A, removing the pin core 8 that is used for forming the insertion hole 1 in the first molded piece 2 in the former step from the first molded piece 2, and injection molding the second molded piece 4 from a second plastic resin B.

1 Claim, 15 Drawing Sheets

2 : First molded piece
5 : First molded piece
4 : Second molded piece
6 : Second molded piece 14 : Third molded piece
16 : Third molded piece

PRIOR ART

METAL MOLD FOR A CONNECTED PRODUCT AND METHOD OF MOLDING THE PRODUCT

FIELD OF THE INVENTION

The present invention relates to a metal mold for molding a plastic product which is made up of two or more pieces and a method of molding such plastic product.

BACKGROUND OF THE INVENTION

It is well-known that a spectacle case H as shown in FIG. 15(a) is produced by a metal mold using two materials. The spectacle case H is composed of a substantially boat-shaped main body H1 for storing glasses or the like and a lid H2 that is rotatably connected to the main body H1 with hinge portions J. As shown in FIG. 15(b), the hinge portions J are so constructed that an insertion hole b formed in the main body H1 supports an insertion portion (hinge pin) p formed on the lid H2.

The aforementioned spectacle case H is produced using a metal mold with a movable sleeve S. Specifically, the main body H1 and the lid H2 shown in FIG. 15(b) are produced by injecting heat-melted plastic resin into two cavity portions made in the shapes of the main body H1 and the lid H2 under pressure and then cooling the resin. In this specification, the term "cavity portion" indicates a hollow portion in the formed in a closed metal mold as a cavity or a hollow portion formed between a cavity and a core.

In the aforementioned production process, the two cavity portions are connected at the positions corresponding to the insertion holes b and the insertion portions p in the hinge portions J. The movable sleeve S acts as a core for partitioning the heat melted plastic resin between the two cavity portions and providing the shape of the insertion hole b. After the plastic resin is cooled, when the movable sleeve S is detached from the insertion hole b and the insertion portion p as shown in the drawing, a space is formed between the insertion hole b and the insertion portion p.

In the case of molding a precision component, a play between the insertion hole b and the insertion portion p needs to be minimized. However, an extremely thin movable sleeve S reduces the strength of the sleeve itself. For this reason, it has been difficult to narrow the space between the insertion hole b and the insertion portion p in accordance with high precision requirements.

Further, when a collar or the like is provided to an edge e of the insertion portion p so as to prevent the insertion portion from coming off the insertion hole, the spectacle case H is released from the metal mold and then, the collar or the like, which is a separate component from the insertion portion p, must be fixed to the edge e of the insertion portion p in a later process. In other words, it is not possible to produce a collar or the like having a longer diameter than the outer diameter of the insertion portion p on the edge e of the insertion portion p at the same time when the spectacle case H is molded.

Accordingly, in order to solve the above problems, we have eventually found the present invention. An object of the present invention is to provide a metal mold of a simple structure that can be used for producing a combined product and a method of molding such combined product.

SUMMARY OF THE INVENTION

The present invention relates to a metal mold for injection molding a combined product composed of a first molded piece having an insertion hole and a second molded piece having an insertion portion that is inserted into the insertion hole. Such metal mold comprises: one or more first piece molds for molding the first molded piece; one or more second piece molds for molding the second molded piece; and one or more pin cores that pass through a portion corresponding to the insertion hole of the first piece mold and the insertion portion of the second piece mold and that are inserted into and removed from the first piece mold and the second piece mold.

The present invention relates to a method of injection molding a combined product composed of a first molded piece having an insertion hole and a second molded piece having an insertion portion that is inserted into the insertion hole. Such method comprises the steps of: injection molding the first molded piece from a first resin and forming the insertion hole by a pin core; removing a part or whole of the pin core from the first molded piece; and injection molding the second molded piece from a second resin and forming the insertion portion by the insertion hole of the first molded piece.

The present invention relates to a method of injection molding a combined product composed of a first molded piece having an insertion hole and a second molded piece having adjacent main molded portions and an insertion portion between the main molded portions that is inserted into the insertion hole. Such method comprises the steps of: inserting a pin core that is used for forming the insertion hole into a portion corresponding to the insertion hole of the first piece mold and the insertion portion of the second piece mold, filling a first resin in the first piece mold for molding the first molded piece, removing the pin core from the portion corresponding to the insertion hole of the first piece mold and the insertion portion of the second piece mold, and filling a second resin in the second piece mold for molding the second molded piece.

Further, in the method of injection molding a combined product according to the present invention, the second resin has a higher mold shrinkage factor than the first resin.

Furthermore, in the method of injection molding a combined product according to the present invention, the first resin has a higher mold shrinkage factor than the second resin.

Further, in the method of injection molding a composed product according to the present invention, the first resin and the second resin are different in color.

Furthermore, in the method of injection molding a combined product according to the present invention, the second resin has a higher mold shrinkage factor than the first resin and is different in color from the first resin.

Further, in the method of injection molding a combined product according to the present invention, the first resin has a higher mold shrinkage factor than the second resin and is different in color from the second resin.

Furthermore, in the method of injection molding a combined product according to the present invention, the first resin has a higher thermal melting temperature than the second resin.

In addition, the present invention relates to a combined product composed of molded pieces which is molded by a metal mold composed of a first piece mold, a second piece mold provided near the first piece mold, and a pin core passing through the first piece mold and the second piece mold. Such combined product is molded through the steps of inserting the pin core into the first piece mold and the second piece mold, filling a first resin in the first piece mold, removing the pin core form the first piece mold, and filling a second resin in the second piece mold.

Further, in the combined product according to the present invention, the first piece mold and the second piece mold are joined at two or more positions by pins and are integrally formed.

DESCRIPTION OF THE PREFERRED EMBODIMENTS

Figure 1A:
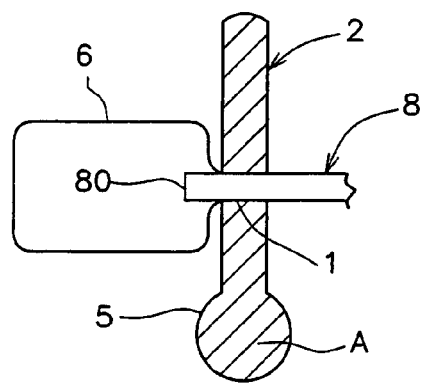
FIGS. 1(a) and 1(b) are a conceptual view of a metal mold according to one embodiment of the present invention and FIG. 1(c) is a sectional view of a hinge portion of the metal mold shown in FIG. 1(a).

Embodiments of a combined product composed of pieces, a mold for the combined product, and a method of molding the combined product will be described below. In the following description, parts similar to those previously described in the Background of the Invention are denoted by the same reference numerals and are not shown in the drawings, and an explanation will not be given thereto.

Figure 1B:
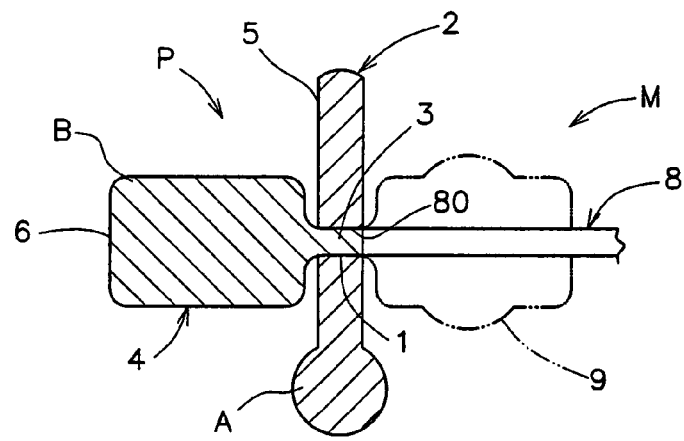

First, an outline of embodiments of the present invention will be described. As shown in FIGS. 1(a) and 1(b), a combined product P according to the present invention is composed of a first molded piece 2 having an insertion hole 1 (e.g. bearing hole) and a second molded piece 4 having an insertion portion (e.g. axis) 3 that is inserted into the insertion hole 1.

A metal mold M for molding the aforementioned combined product P comprises a first piece mold 5 for molding a first molded piece 2, a second piece mold 6 for molding a second molded piece 4, and a pin core 8 for molding an insertion hole 1. The first piece mold 5, the second piece mold 6, and a later-described piece mold 9 can be of any shape or can be freely determined or selected. Therefore, in the drawings, the first piece mold 5, the second piece mold 6, and the later-described piece mold 9 do not assume a specific shape of the combined product P, and the metal mold M dose not limit the shape of the combined product P.

Generally, a method of molding the combined product P comprises the steps of: injection molding the first molded piece 2 from a first plastic resin A, as shown in FIG. 1(a); removing a pin core 8 that is used for forming the insertion hole 1 in the first molded piece 2 from the first molded piece 2, as shown in FIG. 1(b); and injection molding the second molded piece 4 from a second plastic resin B.

By removing the pin core 8 from the first molded piece 2 as described above, the second plastic resin B is also filled in the insertion hole 1 of the first molded piece 2, as shown in FIG. 1(b), in the step of injection molding the second molded piece 4 from the second plastic resin B. In this way, the insertion portion 3 is produced.

Figure 1C:
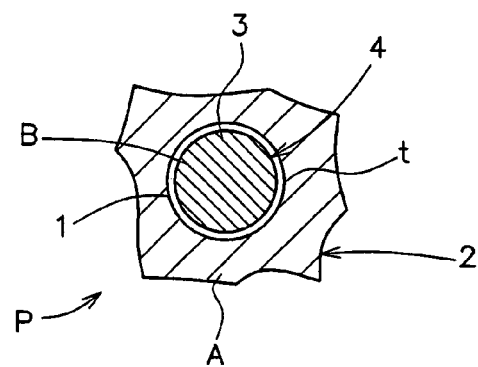

Further, when the second plastic resin B is cooled, a space t is formed between the insertion hole 1 and the insertion portion 3, as shown in FIG. 1(c). This is because the first plastic resin A and the second plastic resin B have a different mold shrinkage factor. As the second plastic resin B has a higher mold shrinkage factor than the first plastic resin A, the space t becomes wider.

In the step shown in FIG. 1(b), an end 80 of the pin core 8 is flush with the right-side inner surface of the first piece mold 5 by removing the whole pin core 8 from the first piece mold 5. However, the second plastic resin B may be filled in the second piece mold 6 with the end 80 of the pin core 8 set inside the first piece mold 5.

Alternatively, the pin core 8 may be slid more to the right than its position shown in FIG. 1(b). In this case, if another piece mold 9 as illustrated by phantom line is formed in such a position that the second piece mold 6 and the piece mold 9 are symmetric with respect to the first piece mold 5, the second plastic resin B is also filled in the piece mold 9. In this way, pieces of various shapes can be integrally molded on both side of the insertion portion 3. The piece mold 9 belongs to the second piece mold 6.

Alternatively, in the step shown in FIG. 1(a), the second piece mold 6 may be omitted. The pin core 8 may not be completely passed through the first piece mold 5 as shown in FIG. (a), but only a part of the pin core 8 may be inserted into the first piece mold 5. In other words, the end 80 of the pin core 8 is set inside the first piece mold 5.

In this case, when the first plastic resin A is injected into the first piece mold 5, it enters to the edge of the end 80 placed inside the first piece mold 5. Therefore, the insertion hole 1 does not become a through hole but a horseshoe-shaped hole that is concave on the right side in FIG. 1(a). When the second plastic resin B is filled in the piece mold 9, a bit shorter insertion portion 3 is formed. Viewed from the left side of the combined product P, the end face of the insertion portion 3 is hidden behind the first plastic resin A filled in the first piece mold 5.

Next, detailed construction of the aforementioned embodiment will be described. An specific example of the combined product P is an adjustable fin unit shown in FIGS. 2(a) and 2(b). The combined product P consists of a frame body 10 that is provided to an air outlet of an automobile and a plurality of fins 11 that is attached inside the frame body 10. Both ends of the respective fins 11 are rotatably joined to the frame body 10 as insertion portions 3.

The both ends of the fin 11 jut outward from the frame body 10. For example, a knob portion 11a is formed on the one end of the fin 11, a gear portion 11b is formed on the other end of the fin 11, and a fin body 11c is formed between the two insertion portions 3. The knob portion 11a is used for changing the direction of the fin body 11c by turning it with fingers. The gear portion 11b interlocks a plurality of fin bodies 11c. A crank and a connected rod can be substituted for the gear portion 11b.

Figure 2A:
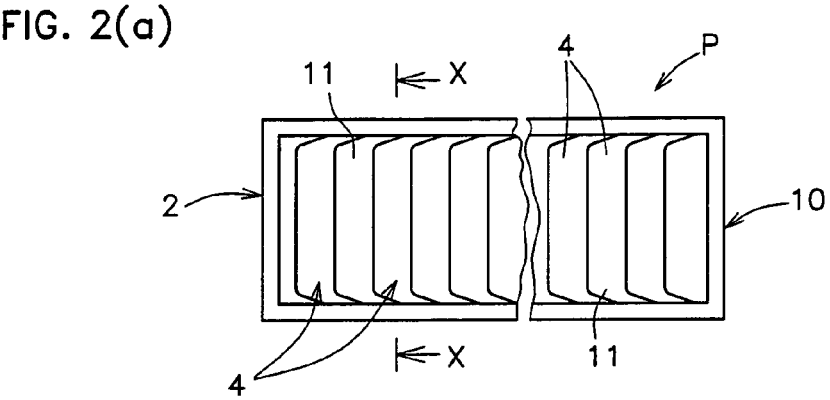
FIG. 2(a) is a plan view of an example of a combined product composed of pieces according to one embodiment of the present invention and FIG. 2(b) is a sectional view taken on line X-X of FIG. 2(a).
Figure 2B:
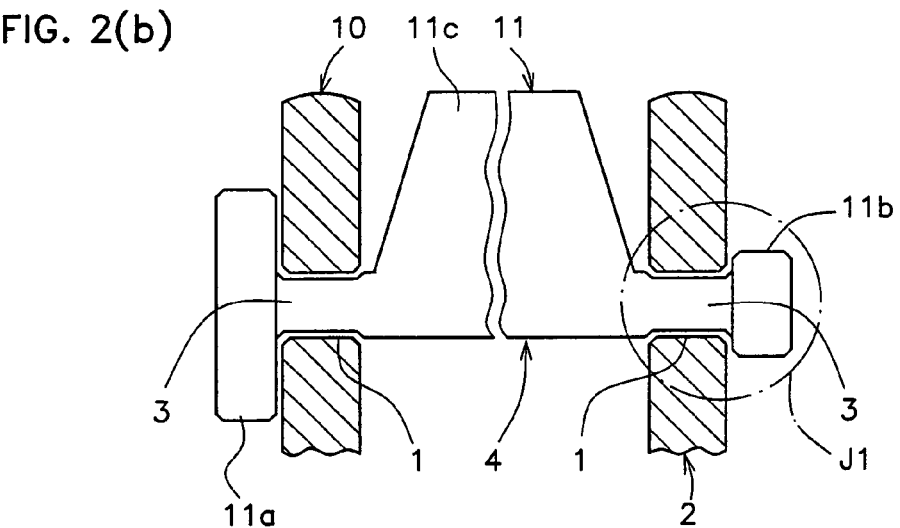
Figure 3:
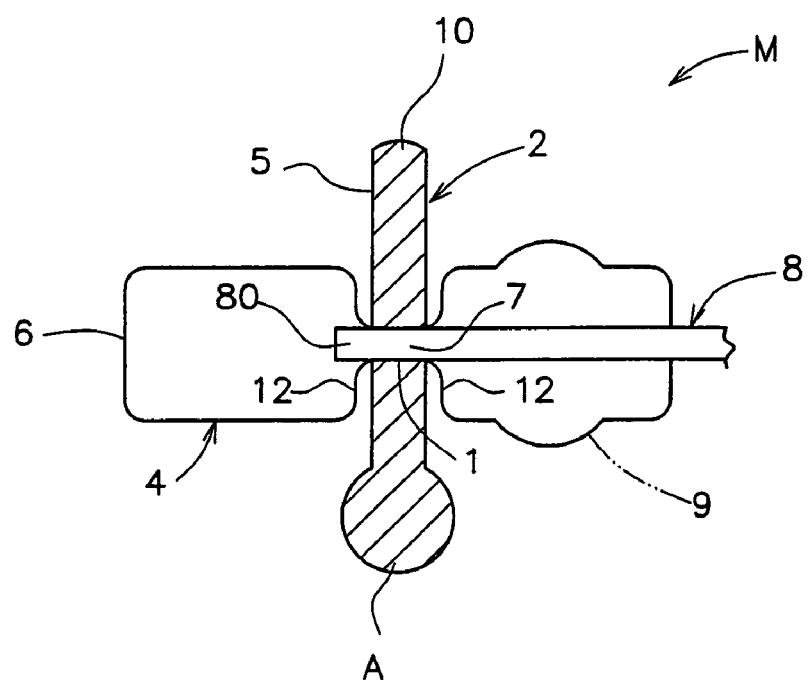
FIG. 3 is a conceptual view showing a first step of injection molding using the metal mold according to one embodiment of the present invention.
Figure 4:
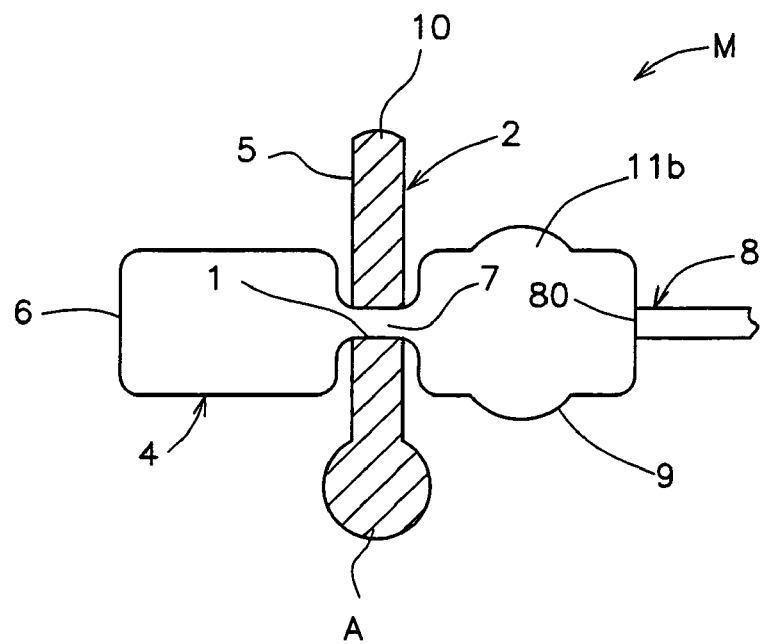
FIG. 4 is a conceptual view showing a second step of injection molding using the metal mold according to one embodiment of the present invention.
Figure 5:
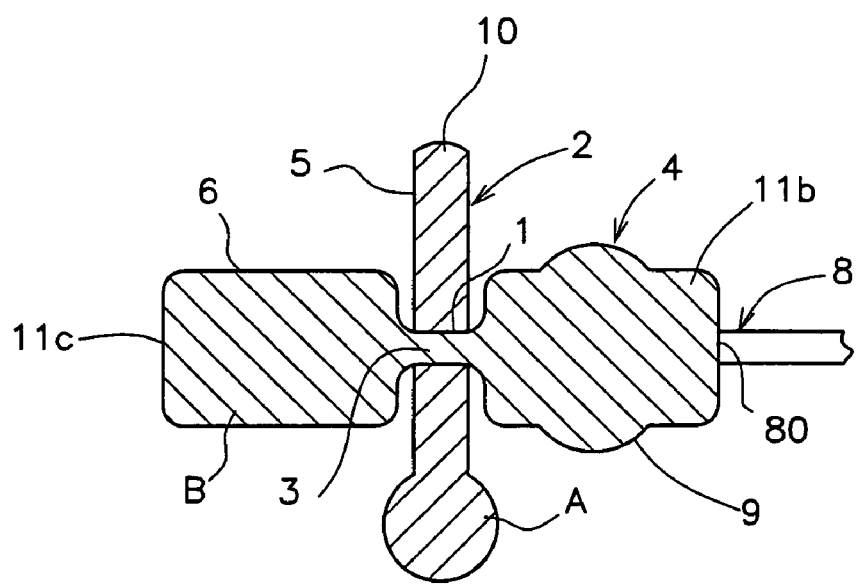
FIG. 5 is a conceptual view showing a third step of injection molding using the metal mold according to one embodiment of the present invention.

FIGS. 3 to 5 are a plan view showing a main part of the metal mold M for molding the combined product P and conceptually show a part corresponding to a rotating portion J1 shown in FIG. 2(a) and 2(b). The first piece mold 5 and the second piece molds 6 and 9 are of any shape. The frame body 10 and the fin 11 will be hereinafter described in relation to the first molded piece 2 and the second molded piece 4, respectively. The knob portion 11a, the gear portion 11b, and the fin body 11c are bigger than an outer diameter of the insertion portion 3 and will be hereinafter referred to as main molded portions.

As shown in FIGS. 3 to 5, the metal mold M comprises a first piece mold 5 for molding a first molded piece 2, a plurality of second piece molds 6 and 9 for molding main molded portions 11b and 11c of a second molded piece 4, and a pin core that can be inserted into and removed from the first piece mold 5 and the second piece mold 6. The pin core 8 passes through a portion 7 corresponding to an insertion hole 1 and an insertion portion 3, and can be slid in the horizontal direction in FIGS. 3 to 5.

The combine product P is injection molded using the metal mold M through the following steps (a) to (e).

Step (a): As shown in FIG. 3, the pin core 8 is inserted into a portion 7 corresponding to the insertion hole 1 and the insertion portion 3. In the metal mold M, a thin-walled portion 12 is formed between the first molded piece 2 and the second molded piece 4 so as to secure a space therebetween. In this specification, the portion 7 corresponding to the insertion hole 1 and the insertion portion 3 is a circular through hole that passes through the thin-walled portion 12. Therefore, the first piece mold 5 and the second piece molds 6 and 9 are connected through the portion 7 (through hole) corresponding to the insertion hole 1 and the insertion portion 3.

The pin core 8 is a kind of slide core. It can be slid by a hydraulic cylinder or the like provided to the metal mold M regardless of opening and closing motion of the metal mold M. When the pin core 8 is inserted into the portion 7 corresponding to the insertion hole 1 and the insertion portion 3, the first piece mold 5 and the second piece molds 6 and 9 are cut off by the pin core 8.

Step (b): The first molded piece 2 is molded by filling a first plastic resin A in the first piece mold 5 under pressure. In this step, the insertion portion 1 is formed by the pin core 8. As the first plastic resin A, ABS resin (acrylonitrile, butadiene, styrene) can be suitably used, for example. A mold shrinkage factor of such plastic resin is about 7/1000.

Step (c): As shown in FIG. 4, the pin core 8 is removed from the portion 7 corresponding to the insertion hole 1 and the insertion portion 3 by sliding it in the right direction of the drawing. Thus, the second piece molds 6 and 9 are connected through a hole formed between them. Although the end 80 of the pin core 8 is flush with the inner surface of the second piece mold 9 in this drawing, it may jut into the second piece mold 9. Alternatively, the pin core 8 may be slid in the right direction of the drawing.

Step (d): As shown in FIG. 5, the second molded piece 4 is molded by filling the second plastic resin B in the second piece molds 6 and 9 under pressure. In this step, the second plastic resin B is also filled in the insertion hole 1 of the first molded piece 2 and thus the insertion portion 3 is formed. As the second plastic resin B, polypropylene can be suitably used, for example. A mold shrinkage factor of polypropylene is about 16/1000.

In the aforementioned step (c), the pin core 8 may stay in the portion 7 and then it is removed from the portion 7 by sliding it in the right direction of the drawing by using an injection pressure of the second plastic resin B. Unless the second plastic resin B has a lower thermal melting temperature or extremely higher thermal melting temperature than the first plastic resin A, the first plastic resin A does not melt even if it touches the second plastic resin B in the aforementioned step (d).

Step (e): After the completion of cooling of the first plastic resin A and the second plastic resin B, the metal mold M is opened and the combined product P is removed from the metal mold M. Since a space is formed between the insertion hole 1 of the first molded piece 2 and the second molded piece 4 as described above, the first molded piece 2 and the second molded piece 4 are in sliding contact with each other and rotate freely.

The first plastic resin A and the second plastic resin B may be such resin as acryl, polycarbonate, polyethylene, polystyrene, polyvinyl chloride, and polyamide , as far as it can be used in the injection molding. Also, since an injection molding press, overall construction of the metal mold M, ejector pin for releasing the combined product P from the metal mold M, and spool, runner, or gate for injecting the first plastic resin A and the second plastic resin B into the metal mold M may vary depending on the shape and size of the first molded piece 2 and the second molded piece 4, they are not shown in the drawings and are not described in this specification.

Figure 6A:
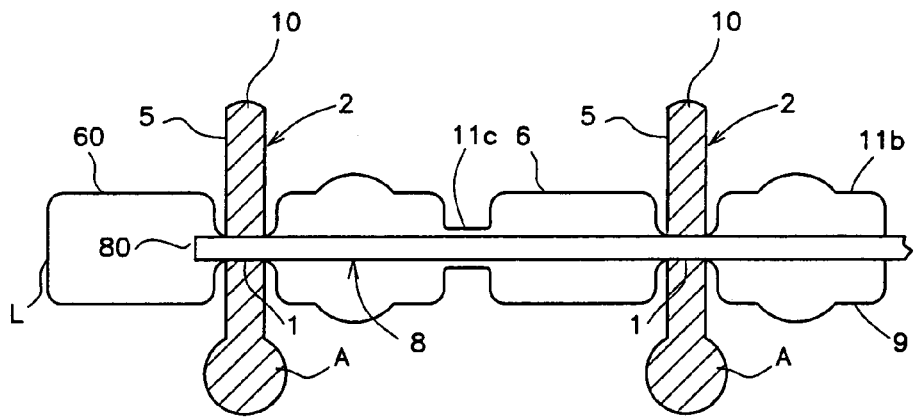
FIG. 6(a) is a conceptual view showing a first step of injection molding using a modification of the metal mold according to one embodiment of the present invention and 6(b) is a conceptual view showing another modification of the metal mold.
Figure 6B:
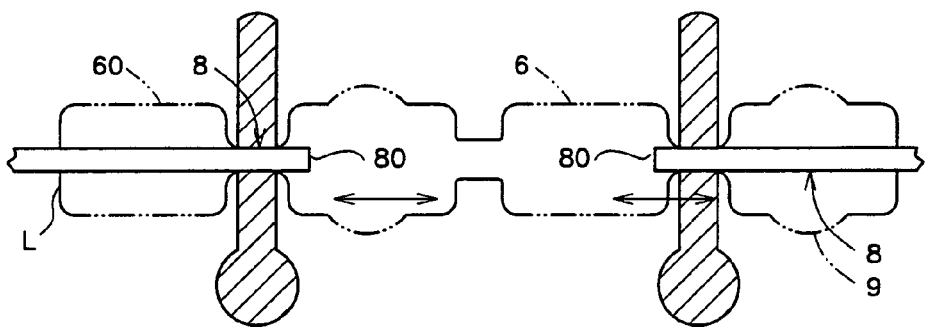
Figure 7:
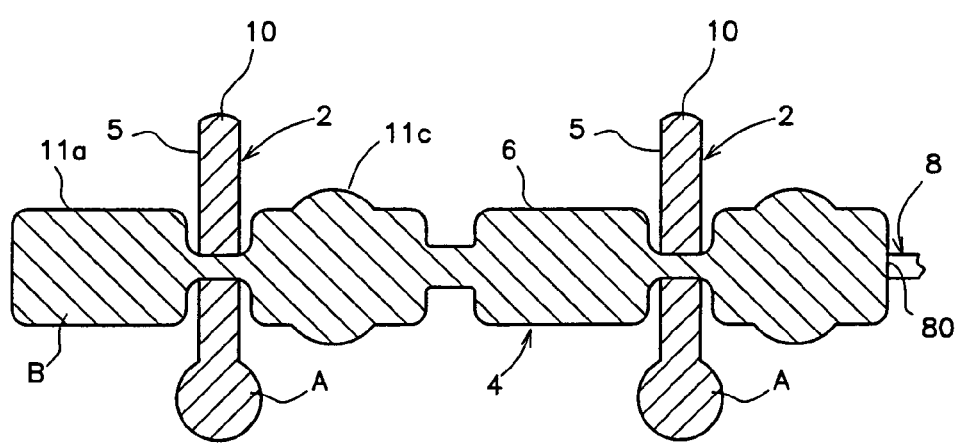
FIG. 7 is a conceptual view showing a second step of injection molding using a metal mold according to one embodiment of the present invention.

Although only the rotating portion J1 shown in FIG. 2(b) has been described above, it is desirable to form two insertion holes 1 and the insertion portions 3 at the same time, as shown in FIGS. 6(a), 6(b), and 7.

Specifically, as shown in FIG. 6(a), a single pin core 8 is inserted into two portions 7 corresponding to two insertion holes 1 and two insertion portions 3 and then the first plastic resin A is filled in the first piece mold 5 under pressure. Thus, the first molded piece 2, namely the frame body 10, is formed. Further, the pin core 8 is slid in the right direction of the drawing so as to connect the second piece molds 6 and 9 as shown in FIG. 7 and the second plastic resin B is filled in the second piece molds 6 and 9. In this way, the second molded pieces 4, namely fins 11, are formed.

The pin core 8 may be divided into two. For example, as shown in FIG. 6(b), the aforementioned pin core 8 and another pin core 8 that can be freely inserted into and ejected form the left end L of the drawing may be provided so that such pair of pin cores 8 can be slid in the horizontal direction of the drawing in such a manner that they move close to or away from each other. In this case, the metal mold can be more compact than the mold that is used for forming two insertion holes 1 by one pin core 8.

While the first piece mold 5 shown in FIGS. 6(a) and 6(b) has been described in correspondence with the first molded piece 2, namely the frame body 10, the two piece molds 5 that are placed on the right and left sides in the drawing may be a separate mold. In this case, the composed product P is molded using three mold parts. Further, the number of the first piece mold 5, the second piece mold 6, or the pin core 8 may be two, three, or more. As the numbers of the first and the second piece molds 5 and 6 are increased, three or more kinds of plastic resins may be used for filling them in the first and the second piece molds 5 and 6.

It is not important whether or not the insertion portion 3 can actually rotate inside the insertion hole 1. The insertion hole 1 and the insertion hole 3 may act as a sliding joint which can freely slide in their axial (longitudinal) direction. Therefore, the pin core 8 is not necessarily circular in cross section, but it may be polygonal or may have a key slot in cross section.

Further, the mold shrinkage factor of the first plastic resin A may be higher than that of the second plastic resin B. In this case, the insertion hole 1 and the insertion portion 3 are tightly fit and fixed to each other. Further, the second plastic resin B and the first plastic resin A may be the same material. Regardless of the mold shrinkage factor, the first plastic resin A and the second plastic resin B may be different in color so as to achieve colorful combined product.

It should be understood that the present invention be not limited to the aforementioned embodiments. Various improvements, modifications, and variations can be made to the embodiments on the basis of knowledge of the those skilled in the art without departing from the scope of the present invention.

Next, a combined product, a metal mold, and a method of molding such combined product according to other embodiments of the present invention will be described below. Parts similar to those previously described are denoted by the same reference numerals and will not be hereinafter shown in the drawings and described.

Figure 8:
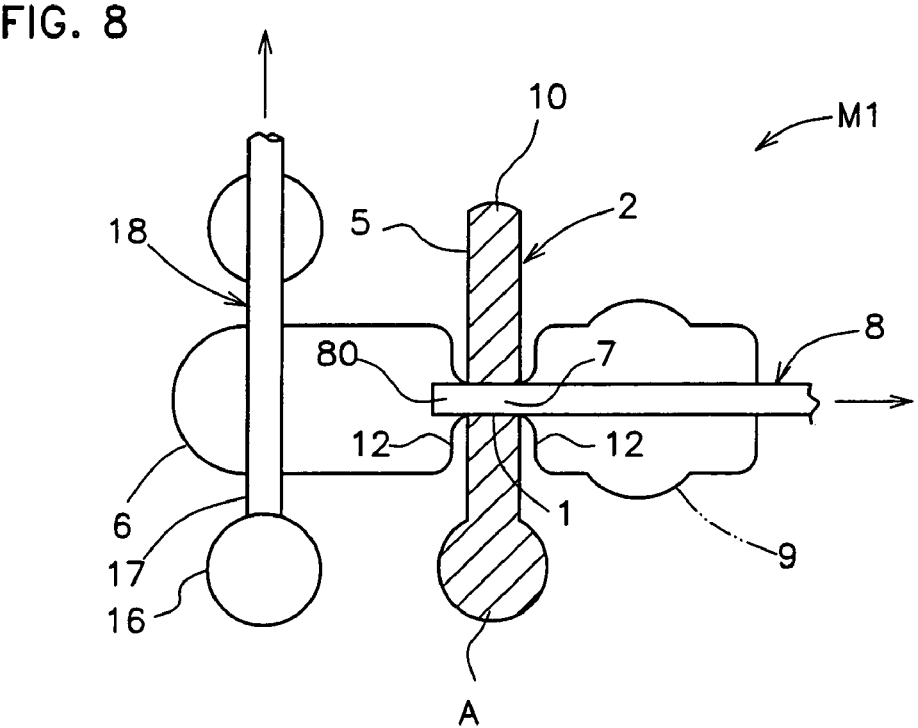
FIG. 8 is a conceptual view showing a first step of injection molding using the metal mold according to another embodiment of the present invention.
Figure 9:
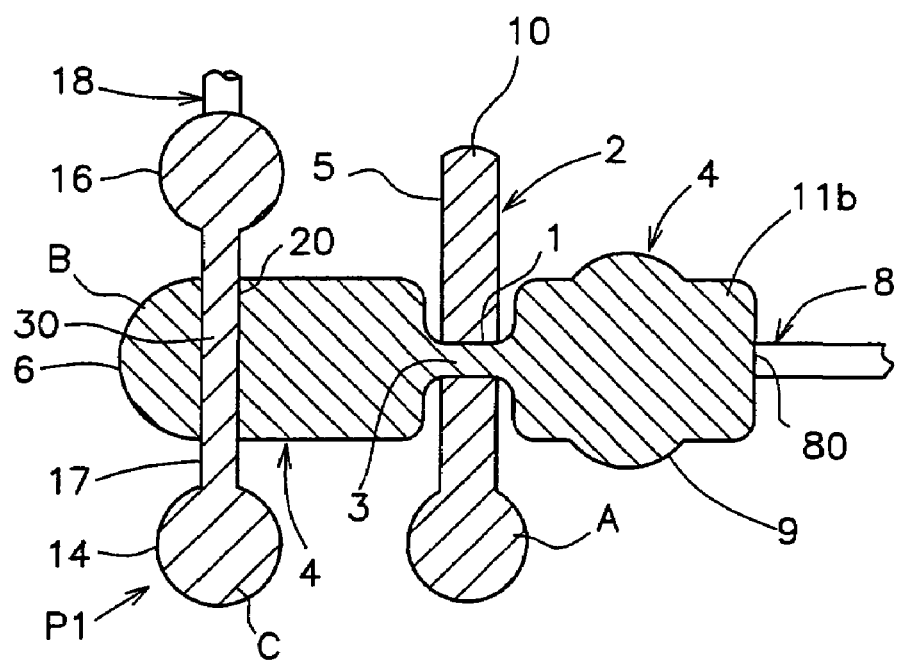
FIG. 9 is a conceptual view showing a third step of injection molding using the metal mold according to the present invention.

It should be understood that the terms "first" and "second" are used herein only for discriminating essential components of the present invention and are not intended to limit the essential components to two. For example, as shown in FIGS. 8 and 9, an insertion hole 20 may be formed in the second molded piece 4 using a pin core 18. This second molded piece 4 having the insertion hole 20 is defined as a new molded piece 1. Then a new second molded piece (hereinafter referred to as a "third" molded piece 14) having an insertion portion 30 that is inserted into an insertion portion 20 may be formed. Namely, a relation between a second piece mold 6 and a third piece mold 16 is comparable to a relation between the first piece mold 5 and the second piece mold 6.

A metal mold M1 comprises a first piece mold 5, a second piece mold 6, a pin core 8, a third piece mold 16 for molding a third molded piece 14, and a pin core 18 for forming an insertion portion 20 in the second molded piece 4 (second plastic resin B).

Like the aforementioned molding method, a method of molding a combined product P1 comprises the steps of: injection molding a first molded piece 2; immediately after that, removing a pin core 8 from the first molded piece 2; and injection molding a second molded piece 4. In addition, the method of molding a combined product P1 further comprises the steps of: removing the pin core 18 that is used for forming an insertion hole 20 in the second molded piece 4; injecting a third plastic rein C into a third piece mold 16; and cooling the third plastic resin C until it is hardened.

By removing the pin core 18 from the second molded piece 4 in the aforementioned manner, the third plastic resin C is filled in the insertion hole 20 in the step of injection molding the third molded piece 14 from the third plastic resin C, and thus the insertion portion 30 of the third molded piece 14 is formed. Further, when the third plastic resin C is cooled, a space is formed between the insertion hole 20 and the insertion portion 30. As described above, this is caused by a difference in mold shrinkage factor.

Figure 10:
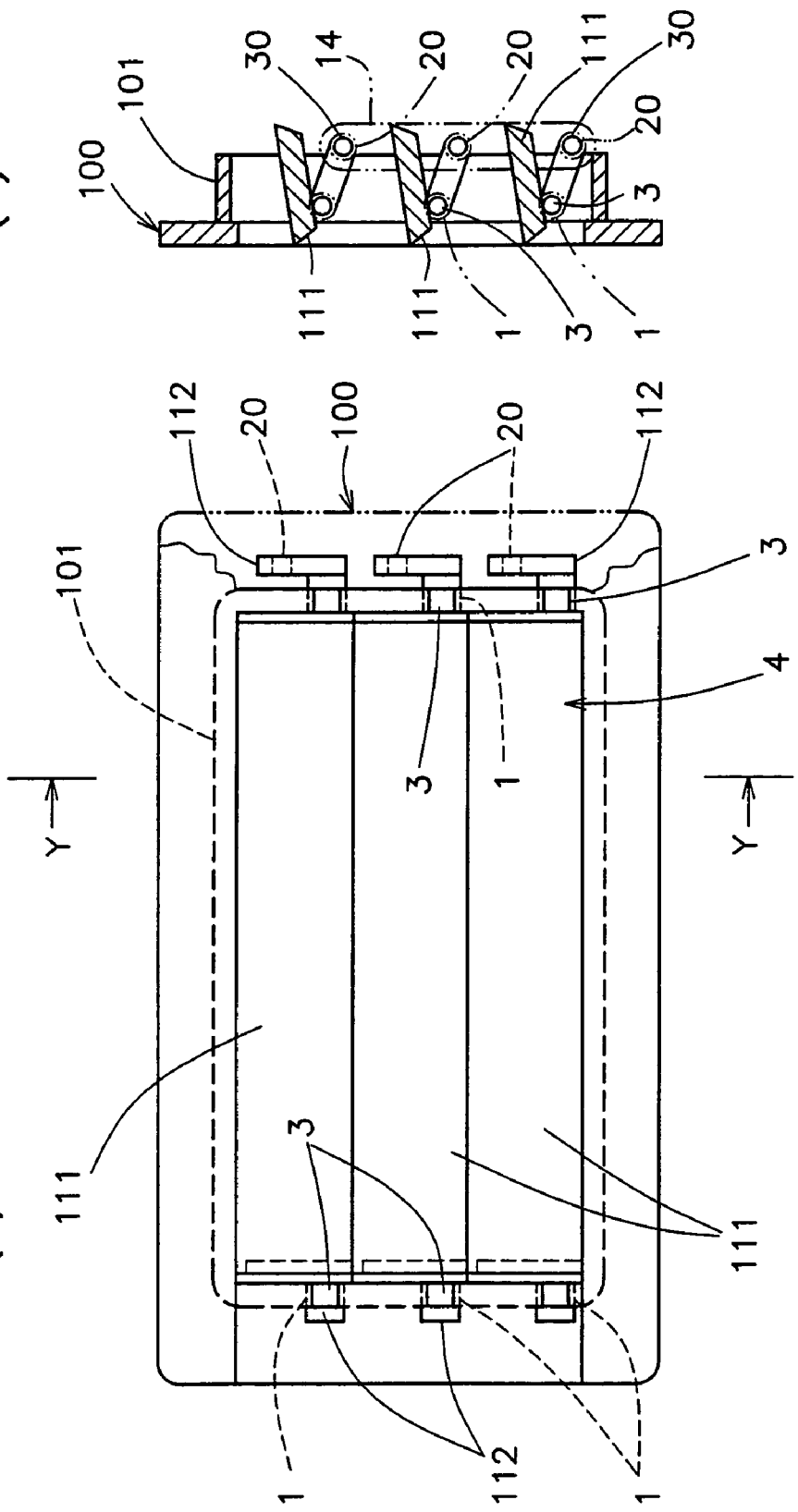
FIG. 10(a) is a plan view of an example of a combined product composed of pieces according to another embodiment of the present invention and FIG. 10(b) is a sectional view taken on line Y-Y of FIG. 10(a).

A specific example of the combined product P1 is an adjustable fin unit shown in FIG. 10(a). The combined product P1 consists of a frame body 100 (corresponding to the first molded piece 2) that is provided to an air outlet of an automobile and a plurality of fins 111 (corresponding to the second molded piece 4) that are attached inside the frame body 100. Both ends 112 of the respective fin 111 act as insertion portions 3 and are rotatably attached to the frame body 100. One of the ends 112 is a crank and the insertion hole 20 is formed in this end 112.

Further, as shown in FIG. 10(b), the third molded piece 14 of the combined product P1 is a connecting rod. The third molded piece 14 has the insertion portion 30 that is rotatably inserted into the insertion hole 20 and that interlocks the respective fins 111.

In the aforementioned embodiments, the insertion hole 20 is formed in the fin 111 and the insertion portion 30 is formed on the connecting rod, namely the third molded piece 14. However, contrary to the above, if the connecting rod is molded before molding the fins 111, the insertion portion 30 is formed on the fins 111 and the insertion hole 20 is formed in the connecting rod. The counterchanging of the insertion hole 20 and the insertion portion 30 in accordance with the order of molding will be described later.

Figure 11:
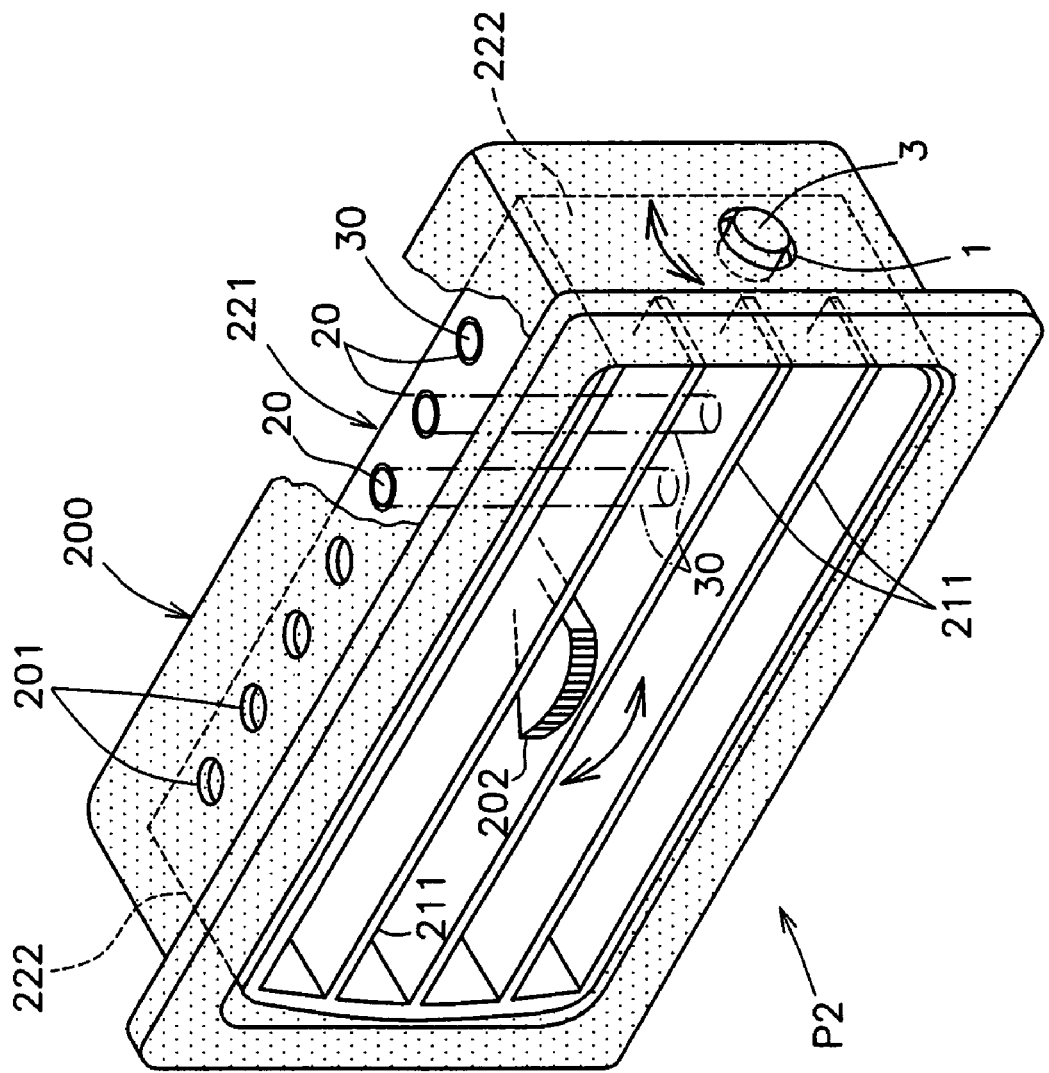
FIG. 11 is a perspective view showing another example of the combined product composed of pieces according to another embodiment of the present invention.

Another example of the aforementioned adjustable fin unit is a combined product P2 as shown in FIG. 11. The combined product P2 comprises: an outer frame body 200 (corresponding to the first molded piece 2) provided to an air outlet of an air conditioner of an automobile; an inner frame body 221 (corresponding to the second molded piece 4) having a plurality of fins 211 that are integrally secured in a horizontal position inside the frame body 200, and an insertion portion 30 that is provided in a vertical position inside the inner frame 221 and that is an axial substance on which a plurality of fins 231 (corresponding to the third molded piece 14) shown in FIG. 12(b) are integrally formed.

The insertion portion 3 juts from both ends 222 of the inner frame body 221 and is supported by the insertion holes 1 formed in the outer frame body 200. The insertion portion 30 on which the fin 231 is integrally formed is rotatably supported by the insertion holes 20 formed in the inner frame body 221. A connecting rod for interlocking a plurality of fins 231 may be injection molded as a fourth molded piece. Alternatively, in order to avoid making the structure of the metal mold M1 extremely complicated, a connected rod may be provided after the combined product P2 is released from the metal mold.

Figure 12A:
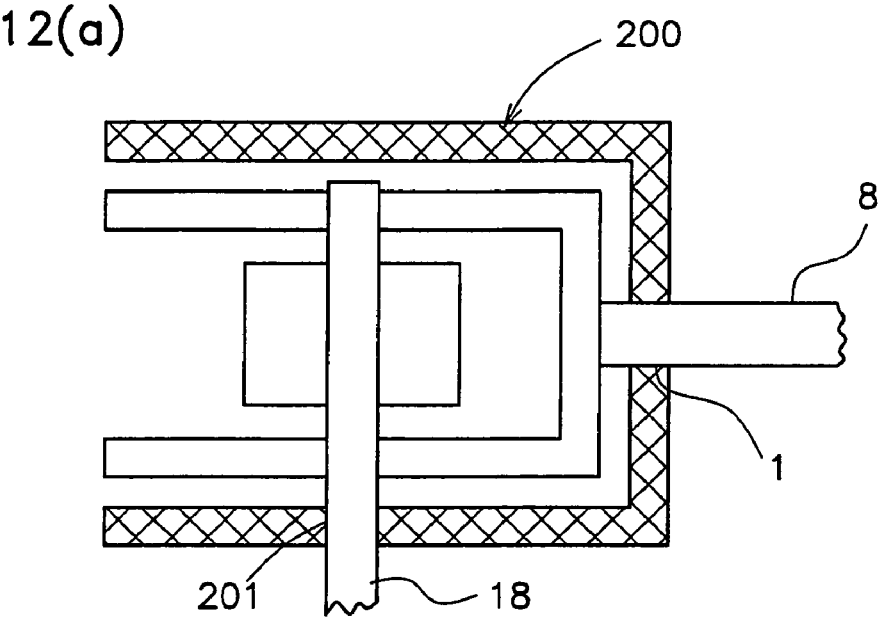
FIG. 12(a) is a conceptual view showing a first step of injection molding a combined product composed of pieces according to another embodiment of the present invention and FIG. 12(b) is a conceptual view showing a second step.
Figure 12B:
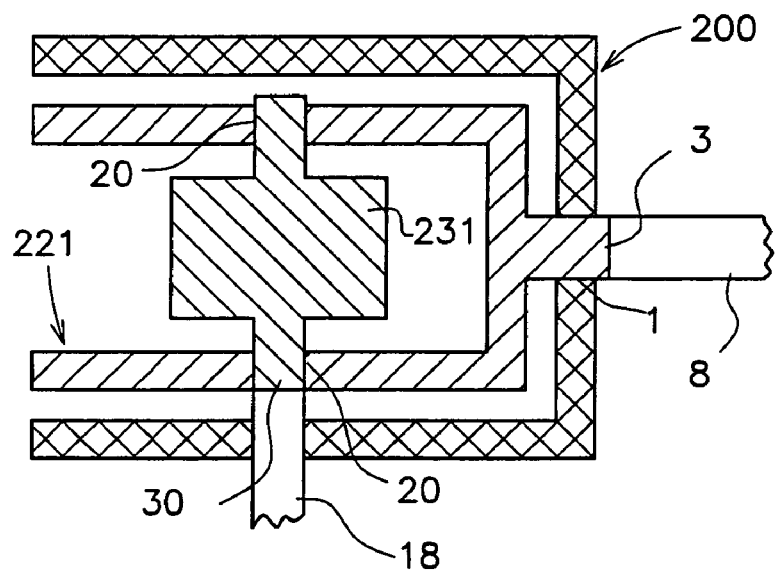

In FIGS. 11 and 12(a), numeral 201 indicates a through hole from which the pin core 18 is removed and numeral 202 indicates a knob for rotating one of the insertion portions 30. The outer frame body 200 is inserted into an opening that is provided beforehand to an installment panel of a car. However, the installment panel itself may be the outer frame body 200. In this case, the installment panel and the combined product P2 can be continuously molded as the first and the second molded pieces 2 and 4.

Figure 13A:
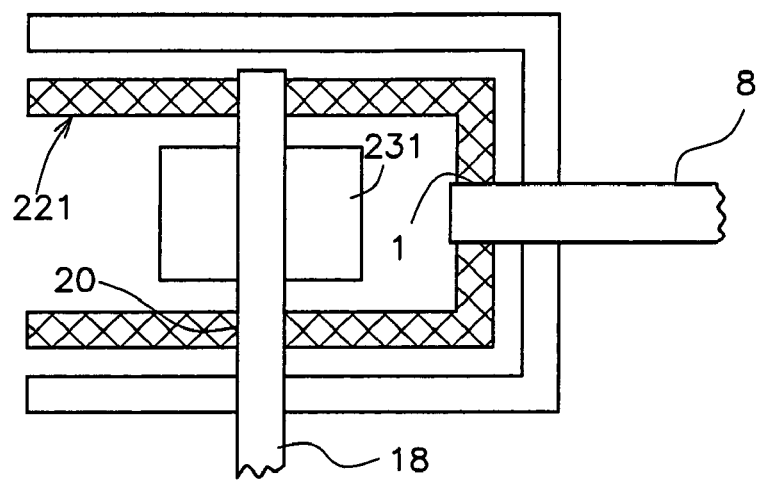
FIG. 13(a) is a conceptual view showing a modification of a first step of injection molding a combined product composed of pieces according to another embodiment of the present invention and FIG. 13(b) is a conceptual view showing a second step.
Figure 13B:
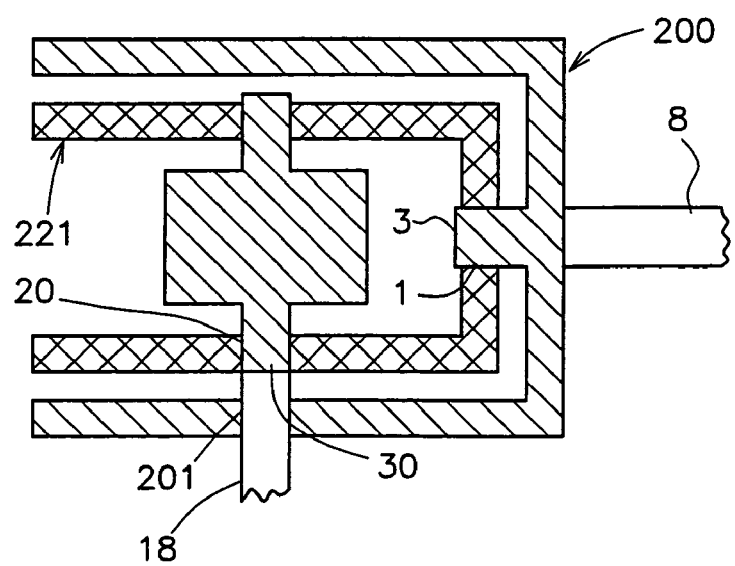

In the case of molding the combined product P2, the insertion hole 1 is formed in the outer frame body 200 and the insertion portion 3 is formed in the inner frame body 221. This is because the outer frame body 200 is injection molded first, as shown in FIG. 12(a), and then the inner frame body 221 is injection molded by pulling the pin core 18 in the outer direction of the outer frame body 200 (pulling it in the right direction of the drawing), as shown in FIG. 12(b). Where the inner frame body 221 is injection molded first as shown in FIG. 13(a), then the pin core 8 is pulled out to the position shown in FIG. 13(b), and subsequently the outer frame body 200 is injection molded, the insertion portion 3 is formed on the outer frame body 200 and the insertion hole 1 is formed in the inner frame body 221.

Figure 14:
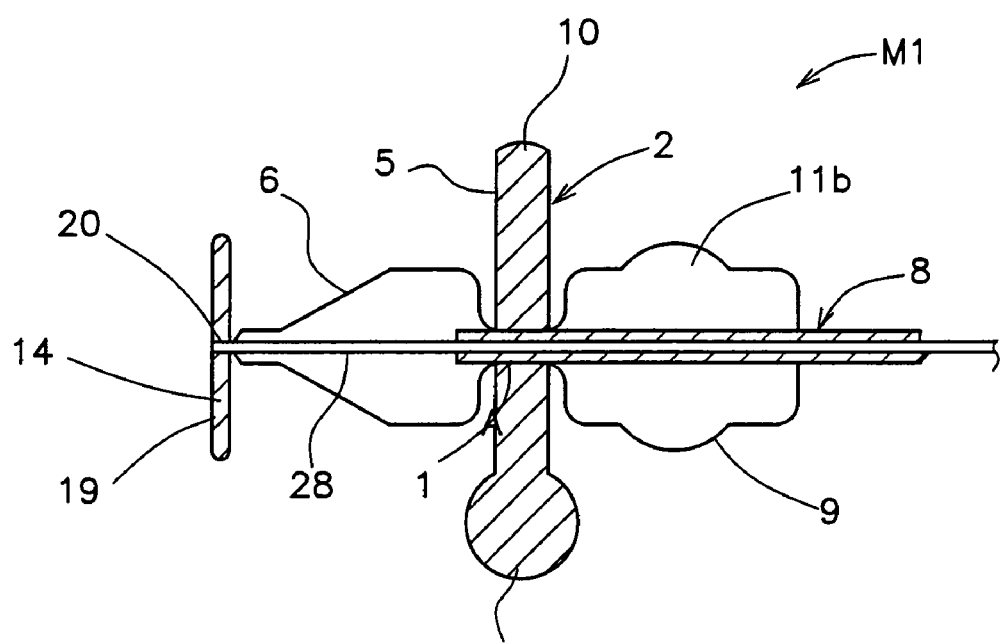
FIG. 14 is a conceptual view showing a modification of the metal mold according to another embodiment of the present invention.
Figure 15A:
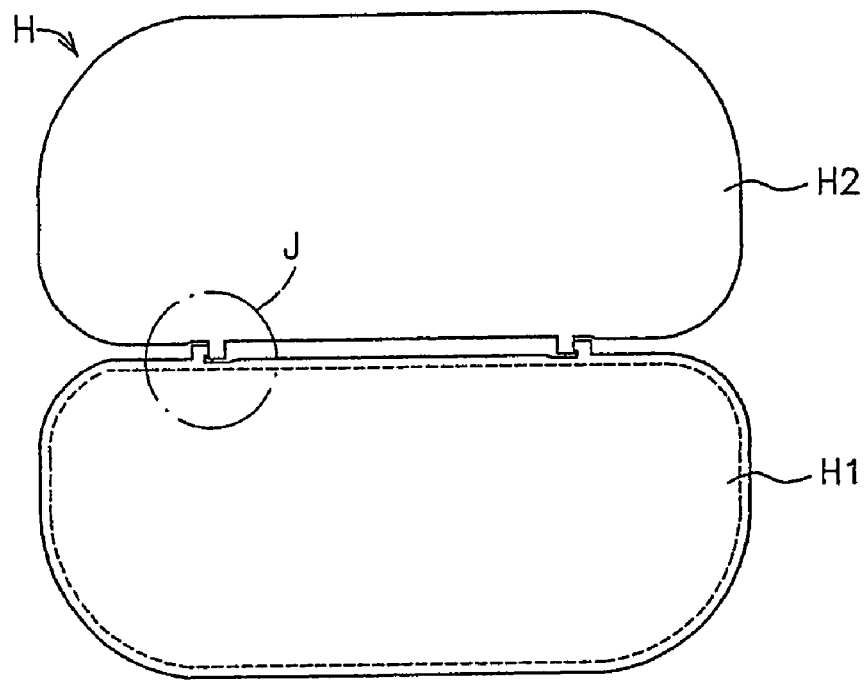
FIG. 15(a) is a developed view of a conventional combined product composed of pieces and FIG. 15(b) is a sectional view of a hinge portion shown in FIG. 15(a).
Figure 15B:
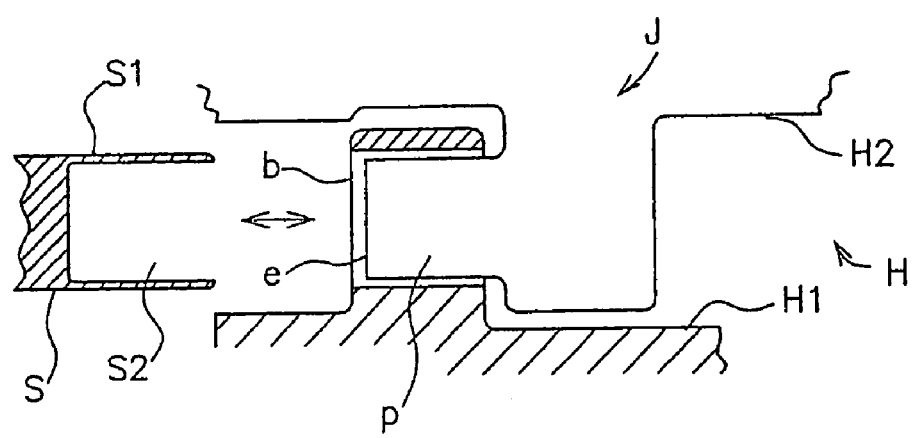

Further, as shown in FIG. 14, the pin core 8 may be a sleeve core into which a needle core 28 having a shorter inside diameter than the pin core 8 is inserted. In this case, the insertion hole 1 of the second molded piece 4 and the insertion hole 20 of the third molded piece 14 can be different in diameter. Also, the pin core 8 and the needle core 28 may be slid through a different distance. Alternatively, in order to intentionally change the order of injection molding the first to third molded pieces 2, 4 and 14, one of the pin core 8 and the needle core 28 may be slid while the other stays.

As described above, in the metal mold for a combined product composed of pieces and the method of molding such composed product according to the present invention, a main molded portion that has a larger outside diameter than the insertion portion can be formed on one or both side(s) of the insertion portion for a short time through simple steps in which two injection molding steps are carried out in just one action of opening and closing of the mold. Therefore, no process is necessary after releasing the combined product from the metal mold.

Since a quite narrow space whose width is some thousands of millimeters of the inside diameter or outside diameter of the insertion hole is formed between the insertion hole and the insertion portion due to a difference in mold shrinkage factor between the two kinds of resins, a play between the insertion hole and the insertion portion can be minimized.

Therefore, a combined product composed of some molded pieces can be produced in quantities for a short time using a mold of a simple structure regardless of the accuracy and the shape of a desired combined product.

When a mold shrinkage factor of a first resin is set higher than that of a second resin, the insertion hole and the insertion portion are tightly fit so that they can be fixed to each other. By using different colors of resins as the first and the second resins, a colorful combined product can be achieved.

INDUSTRIAL APPLICABILITY

A metal mold for a combined product of some molded pieces and a method of molding such combined product according to the present invention are suitably used for producing a combined product that can be obtained by rotatably joining a first molded piece to a second molded piece by pins, such as a spectacle case described above as an example.

Further, where an installment panel or the like of a car is molded, a main body of such installment panel and other parts that are rotatably provided to the main body can be molded in succession in just one action of opening and closing of the mold. For example, in the case where an air outlet of an air conditioner is formed in a dashboard of a car and an adjustable fin unit is provided to this air outlet, the dashboard itself and the adjustable fin unit can be molded in succession in just one action of opening and closing of the mold. Therefore, the production cost of the car can be dramatically reduced.

Generally, in the case of a product having a pin joint or a joint part, the pin joint or joint part is necessary to be assembled. However, if the present invention is used for producing such product having a pin joint or a joint part, assembling of the product can be conducted at the same time of the injection molding. Therefore, such combined product can be produced quickly at a low cost.

What is claimed is:

1. A method of injection molding a combined product composed of a first molded piece having an insertion hole and a second molded piece having adjacent main molded portions and an insertion portion between the adjacent main molded portions that is inserted into the insertion hole, said method comprising the steps of:

preparing a (1) first piece mold for molding said first molded piece; (2) one second piece mold for molding one main molded portion that is bigger than an outer diameter of the insertion portion, wherein at least a thin-walled portion is formed between the first piece mold and the second piece mold; (3) another second piece mold for molding another main molded portion that is bigger than the outer diameter of the insertion portion, wherein at least a thin-walled portion is formed between the first piece mold and the another second piece mold; and (4) a pin core for molding the insertion hole of the first molded piece;

cutting off the first piece mold, the one second piece mold, and the another second piece mold by inserting the pin core into a portion corresponding to the insertion hole and the insertion portion;

filling a first resin in the first piece mold;

connecting the one second piece mold and the another second piece mold through a hole formed between them by removing the pin core from the portion corresponding to the insertion hole and the insertion portion; and filling a second resin, in the second piece mold having a mold shrinkage factor that is bigger than the first resin, in the one second mold piece and the another second piece mold.

* * * * *